(12) United States Patent
Killick et al.

(10) Patent No.: US 10,104,443 B2
(45) Date of Patent: Oct. 16, 2018

(54) DYNAMIC METADATA FOR MEDIA CONTENT DELIVERY

(71) Applicant: COX COMMUNICATIONS, INC., Atlanta, GA (US)

(72) Inventors: Ray Killick, Atlanta, GA (US); Luke Allen Warren, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/490,073

(22) Filed: Sep. 18, 2014

(65) Prior Publication Data
US 2016/0088361 A1    Mar. 24, 2016

(51) Int. Cl.
| | |
|---|---|
| *H04N 21/43* | (2011.01) |
| *H04N 21/81* | (2011.01) |
| *H04N 21/2225* | (2011.01) |
| *H04N 21/84* | (2011.01) |
| *H04N 21/845* | (2011.01) |
| *H04N 21/2387* | (2011.01) |
| *H04N 21/6587* | (2011.01) |
| *H04N 21/258* | (2011.01) |
| *H04N 21/234* | (2011.01) |
| *H04N 21/262* | (2011.01) |
| *H04N 21/2668* | (2011.01) |

(52) U.S. Cl.
CPC ....... *H04N 21/812* (2013.01); *H04N 21/2225* (2013.01); *H04N 21/2387* (2013.01); *H04N 21/23424* (2013.01); *H04N 21/25883* (2013.01); *H04N 21/25891* (2013.01); *H04N 21/262* (2013.01); *H04N 21/2668* (2013.01); *H04N 21/6587* (2013.01); *H04N 21/84* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,704,930 B1 * | 3/2004 | Eldering | H04N 5/44543 348/385.1 |
| 2002/0144262 A1 * | 10/2002 | Plotnick | G11B 27/005 725/32 |
| 2010/0175079 A1 * | 7/2010 | Braun | G06Q 30/02 725/32 |

(Continued)

*Primary Examiner* — Cai Chen
(74) *Attorney, Agent, or Firm* — Eversheds Sutherland (US) LLP

(57) ABSTRACT

Systems and methods for providing estimates of duration of media content requested by a user are disclosed. The estimates of the duration may be updated as advertisements are identified and/or updated for insertion in media content signals to be provided to a client device of the user. The advertisements may be targeted to the user from an inventory of available advertisements based on a variety of factors. While a session is active to provide the client device with the user requested media content new duration estimates corresponding to updates to advertisements targeted for delivery to the user may be provided to the client device via messages and/or metadata. In some cases, this information may be provided by messages sent responsive to a trick play request form the client device. In other cases, an asynchronous message carrying updated duration information may be sent to the client device.

16 Claims, 7 Drawing Sheets

(56) References Cited

U.S. PATENT DOCUMENTS

2011/0145856 A1* 6/2011 Agarwal ............... G06Q 30/02
                                                  725/32
2013/0086607 A1* 4/2013 Tom .................. G06Q 30/0241
                                                  725/32

* cited by examiner

DYNAMIC METADATA FOR MEDIA CONTENT DELIVERY

TECHNICAL FIELD

This disclosure generally relates to media content delivery, and more particularly to metadata associated with the media content and updates thereto.

BACKGROUND

Media content is often distributed by content distributers, such as multiple-system operators (MSO) to customers on demand. Metadata, such as metadata providing the run time of the media content may be provided by the MSO to a client device, such as a set-top box (STB), receiving the media content at the customer's premises. This run time metadata may be used by the client device to provide the customer of the media content with any variety of information, such as remaining run time of the media content or elapsed run time of the media content.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Figure 1:
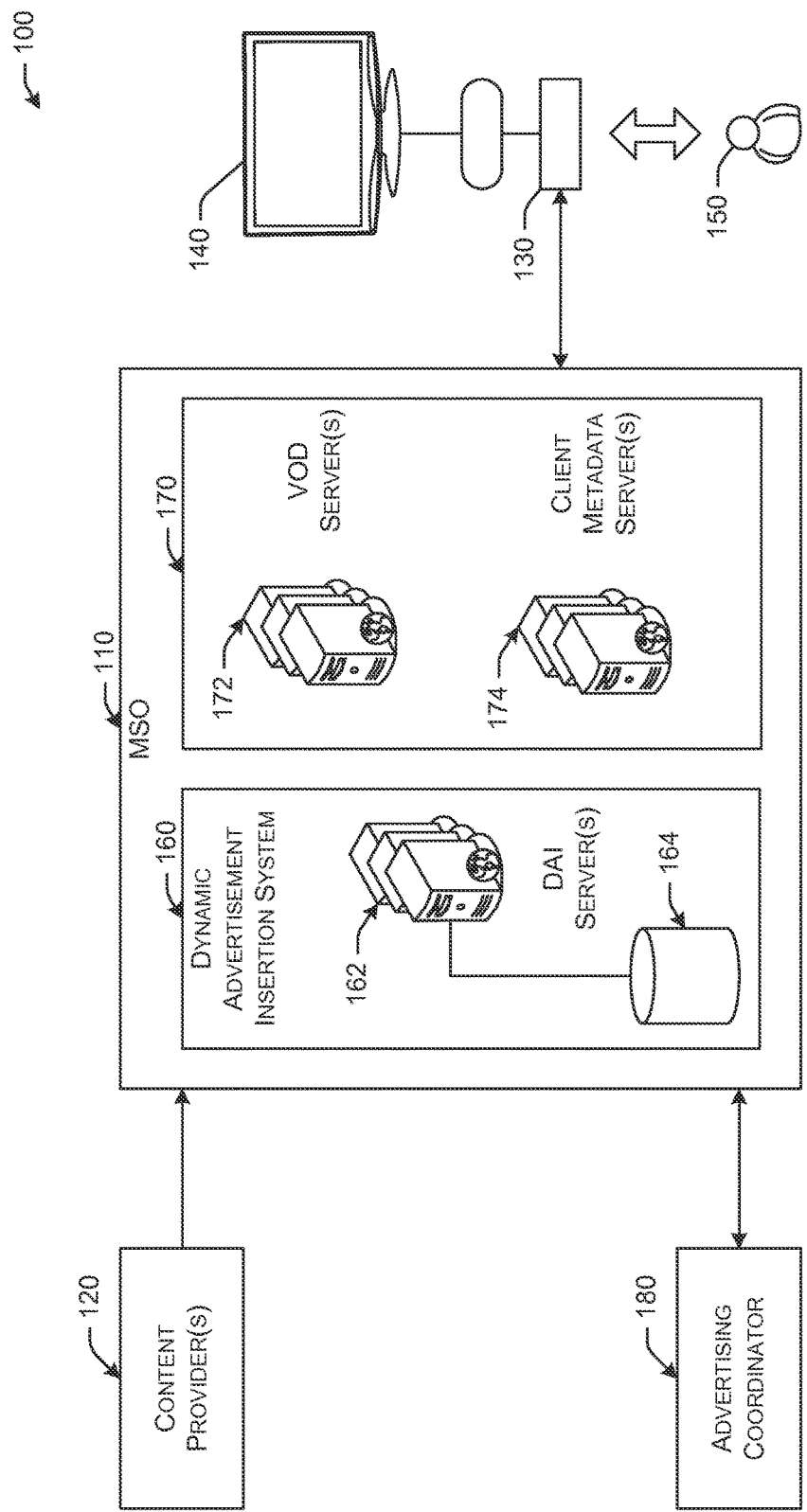
FIG. 1 is a simplified schematic diagram illustrating an environment where content may be delivered by a multiple-system operator (MSO) to a client device along with metadata associated with the content, in accordance with certain example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Example embodiments of the disclosure may provide systems, apparatus, non-transitory computer readable media, and methods for determining a media content's maximum duration with advertising digitally inserted during streaming to a client device. This media content may be programming, such as video or on-demand video, offered by a multiple-system operator, such as a cable television company to a customer of the MSO. Example embodiments may include a back-office solution to update metadata associated with content requested and/or delivered to a user or customer of the MSO via his or her client device. In some example embodiments, metadata indicating an estimate of the run time duration of the content to be provided to the client device may be determined prior to session setup or content fulfillment. In further example embodiments, metadata indicating an estimated run time duration of the content to be provided to the client device may be updated while the content is being provided to and/or retrieved by the client device. The updates to the run time duration estimates, in example embodiments, may occur synchronously at the time of session setup. In the same or further example embodiments, client devices may be updated in an asynchronous fashion by providing duration information in the form of metadata if the program duration of the media content changes while a session is ongoing. The duration of the media content may change, for example, if the ads inserted into ad avails of the media content are changed dynamically while a session is ongoing.

In example embodiments, the MSO may include a dynamic ad insertion system with one or more dynamic ad insertion (DAI) server(s) that may identify one or more ads that are to be provided with a media content requested by a user. These one or more ads may be rendered to the user during one or more ad avails associated with the media content to be provided to the user via his or her client device. The ads to be identified by the DAI server(s) may be pre-roll, post-roll, interstitial, or any other suitable ad placement opportunity. In some example embodiments, the ads that are identified by the DAI server(s) may be for a video-on-demand (VOD) media content asset that is to be provided to a user on an on-demand basis, such as by way of a request from the user for the media content via his or her client device. Alternatively, in other example embodiments, the media content may be provided on a subscription basis or a broadcast basis to the user via his or her client device.

Upon identification of ads to be inserted with the media content to be delivered to the user, the DAI server or other entity, such as one or more video-on demand (VOD) server(s), may be configured to determine a run time length of the media content with the identified ad inserts. In other words, a combined duration may be determined for the media content and the ads that are to be rendered with the media content. In some example embodiments, the combined duration time of the media content with the inserted ads may be estimated and a buffer time may be added to the result to ensure that the duration time provided to the client device is always longer than the actual duration of the media content with the inserted ads. In this way, if the client device is to terminate the session at the end of the provided media content duration, as communicated via metadata at session setup or asynchronously during the session, the termination is relatively unlikely to interrupt the potions of the media content in which the user is most interested. In other words, the programming is likely to be rendered in its entirety to the user, if the estimate of the run time duration is longer, such as 15% longer, than the actual calculation of the run time duration, as provided to the client device from the MSO.

In example embodiments, the metadata providing the media content duration may be provided either directly or via one or more other elements of the MSO, such as a client metadata server, to the client device. During session setup, this metadata may be provided as part of session setup protocol (SSP) metadata. This SSP metadata, in addition to the media content duration, as determined by the DAI server(s) or the VOD server(s), may further include other information related to the media content, such as asset information, modulation information, and/or tuning information (e.g., quadrature amplitude modulation (QAM) channel information). In the case of updates for the media content play duration when a trick play is requested, the MSO and/or entities therein, such as DAI server(s) and/or VOD server(s) may receive a light streaming control (LSC) protocol message, such as from the client device requesting a trick play (e.g., fast forward, rewind, pause, stop, etc. of VOD media content). The response to the LSC message may be intercepted and updated with the latest estimate of the media content duration by the DAI server(s) and/or the VOD server(s). In other words, when a client device requests a trick play via an LSC message, the response may be intercepted to update the runtime provided thereon, in accordance with embodiments of the disclosure.

In further example embodiments, asynchronous updates may be made to the duration of the media content and the ads to be rendered along with the media content. These updates may be communicated by the MSO (e.g., DAI server(s), VOD server(s), and/or client metadata server(s)) to the client device via one or more messages, such as messages encoded as extensible messaging and presence and protocol (XMPP) and/or extensible markup language (XML). In some example embodiments, the ads to be rendered to the user may be updated dynamically while a session is ongoing. Therefore, in these example embodiments, if the DAI server(s) dynamically change (e.g., change while the session is ongoing) the ads that are to be rendered with the media content requested by the user, then an updated duration may be communicated to the client device via an asynchronous message carrying metadata as described herein.

In example embodiments, the DAI server(s) or the VOD server(s) may further be configured to generate manifest file or a playlist that is provided to the client device associated with the user requesting media content, either directly or via one or more other elements of the MSO, such as a client metadata server. This playlist may be used by the client device to obtain segments of the media content and/or inserted ads for rendering to the user via one or more user interfaces, such as a display device and/or speakers, from one or more elements of the MSO, such as the VOD server(s), other media server(s), edge server(s), or the like.

Example embodiments of the disclosure may be understood in reference to FIG. 1. FIG. 1 is a simplified schematic diagram illustrating an environment 100 where content may be delivered by a multiple-system operator (MSO) 110 to a client device 130 along with metadata associated with the content, in accordance with certain example embodiments of the disclosure. The environment 100 may include one or more content provider(s) 120, such as a media content producer or distributor, from which the MSO 110 may acquire media content that may be provided to a user 150 associated with the client device 130. The client device 130 may further be configured to render the media content to be provided to the user 150 on one or more user interfaces 140, such as a video display, speaker, haptic device, or the like.

The content provider(s) 120 may be any suitable entity from which the MSO 110 may be configured to receive content, such as media content. In some cases, the content provider(s) and/or broadcaster(s) 120 may provide content through dedicated communicative links with the MSO 110, such as hard wired (e.g., coaxial cable) links, radio frequency (RF) (e.g., broadcast signal captured when aired) links, and/or satellite up/downlinks. In example embodiments, the MSO 110 may be configured to receive content from the content provider(s) 120 by more than one channel and/or band. In other words, the content provider(s) 110 may be configured to provide the media content to the MSO 110 via any variety of channels, protocols, bands, and/or networks. The content provider(s) 120 may be owned and/or controlled by any variety of organizations including private corporations, publicly- traded companies, partnerships, limited liability companies, for-profit corporations, non-profit corporations, federal, state, or local governments, individuals, combinations thereof, or the like. In some example embodiments, the content provider(s) 120 may be part of and/or controlled by the MSO 110. For example, in some cases, the content provider 120 may be a head end facility of the MSO 110. In other cases, the content provider(s) may be a separate entity from the MSO 110. For example, the content provider 120 may be a creator of original media content that provides the media content to the MSO 110 for the purposes of distribution of the media content.

In some example embodiments, the content provider(s) 120 may include a broadcaster or over-the-air transmitter of media content signals (e.g., television broadcaster). In these cases, the broadcaster may be configured to broadcast its media content over a particular geographic region carried by any variety of RF signals, such as ultra-high frequency (UHF), very-high frequency (VHF), or any other suitable frequency bands. The broadcaster may further be configured to broadcast over-the-air content signals via one or more broadcast stations with one or more call letters. In some example embodiments, the broadcaster may provide the broadcast signal and/or the media content signals via one or more of a hardwired communicative link to the MSO 110 or via a wireless (e.g., RF) communicative link to the MSO 110. In other example embodiments, the broadcaster may not specifically transmit the broadcast signal to the MSO 110, but instead may allow the MSO 110 to receive the broadcast signal from the air and further manipulate the received broadcast signal.

The client device 130 may be any variety of user devices including , but not limited to tablet computing devices, electronic book (ebook) readers, netbook computers, notebook computers, laptop computers, desktop computers, server systems, personal digital assistants (PDA), smart phones, web-enabled televisions, video game consoles, set top boxes (STB), digital video recorder (DVR) systems, combinations thereof, or the like. In some cases, the client device 130 may be a managed client device 130, such as a set-top-box (STB) and in other cases, the client device may not be a managed client device 130. In some cases, the client device 130 may receive media content, as requested by the user, via QAM channels. In other cases, the client device 130 may receive the requested media content via one or more other network protocols, such as transmission control protocol/Internet protocol (TCP/IP). It will be appreciated that the MSO 110, such as a cable company, may be configured to distribute media content to a plurality of client devices 130 and/or users 150 within a geography and/or subscriber group that the MSO 110 services.

The client device 130 may be configured to interact with the user 150 by any suitable mechanism, such as via a remote control and/or control panel on the client device 130. By interacting with the user 150, the client device 130 may be configured to ascertain a media content desired by the user 150 for viewing. The client device 130 may further be configured to request a session during which the user 150 is provided with a rendering of his or her requested media content. The request from the user device 130 for the requested media content may provide an identification of the media content to the MSO 110. This media content may be selected by the user 150 from a library of media content titles that may be offered by the MSO 110 for distribution to the user 150 via his or her client device 130. The client device 130, therefore, may be configured to display a guide of media content titles to the user 150 via one or more user interfaces 140, based at least in part on information received from the MSO 110 of available titles for rendering to the user 150. This media content, upon request, may be received and/or retrieved by the client device 130 from the MSO 110 and/or various elements of the MSO 110. For example, the client device 130 may be configured to receive the media content, such as with ads embedded therein, from one or more video server(s) and/or edge server(s) of the MSO 110. It will be appreciated that, in example embodiments, the media content that is received and/or rendered by the client device 130 may be on-demand content, such as a movie-on-demand (MOD) content.

The client device 130 may further be configured to display the requested and received media content, along with the ads provided with that media content, to the user 150 via the one or more user interfaces 140. Therefore, a session for receiving the requested media content may be established between the MSO 110 and the client device. This session, in some example embodiments, may last for a predetermined period of time, such as a day or one week. The session, in further example embodiments, may be established after the MSO 110 and back-office processes associated therewith determine that the user 150 is eligible to receive the request media content. This determination may be based on any variety of factors, such as, for example, the user's subscription level, the channels to which the user subscribes, or the like. In still further example embodiments, the session may be established based at least in part on charging a fee and/or receiving an authorization form the user 150 by the MSO 110 via the client device 130 to charge a fee for the rendering of the requested media content. During the establishment of the session, the client device 130 may receive a variety of information as metadata associated with the session and/or media content to be rendered. The information may include such elements as asset information, modulation information, and/or tuning information (e.g., QAM channel information). In example embodiments, the information received may further include program duration information as additional metadata provided during session setup. In example, embodiments, the program duration information may be the sum of the ad-free media content duration summed with the duration of each of the ads identified to be rendered with the requested media content.

Upon establishment of the session to provide the requested media content from the MSO 110 to the client device 130, the user 150 may wish to play, rewind, fast forward, play at slow motion the media content. The client device 130 may request, on behalf of the user 150, one of these actions or trick play. When a trick play is requested by the user 150, the client device 130 may be configured to generate and transmit a request for the trick play to the MSO 110, such as via the networks by which the client device 130 receives the media content. The trick play request may be in the form of a real time streaming protocol (RTSP) message, light streaming control protocol (LSCP) message, modifications thereof, of the like. In response, the client device 130, in example embodiments, may be configured to receive updated program information via one or more messages from the MSO 110 when the trick play is requested and/or implemented. In some example embodiments, the duration information, as communicated during a trick play request may be different from the duration information for the same media content communicated during session setup. In example embodiments, the ads identified for rendering with the media content may be modified, such as by the MSO 110, during the session, and therefore, the duration of the programming may be updated. Therefore, a trick play request, in example embodiments, may provide an opportunity after session setup to communicate a revised or updated program duration of the media content from the MSO 110 to the client device 130.

In further example embodiments, the client device 130 may be configured to receive metadata carrying information about the media content from the MSO 110. This metadata may be carried by one or more data packets via the same networks (e.g., content delivery networks (CDN)) by which the media content is received or by alternate communicative links. The metadata, in example embodiments, may be encoded in any suitable protocol and/or standard, such as MQ Telemetry Transport (MQTT), XMPP, or the like.

The client device 130, therefore, in example embodiments, may be configured to receive metadata indicating the duration of a media content at session setup. This duration provided may err on being longer than the actual sum of the media content and identified ads to be rendered with the media content by the MSO 110. In this case, post roll content and/or ads may be identified to fill the time between the true estimate of the media content and ads and the session length (e.g., sum of the media content duration, identified ad duration, and post roll content filler). Furthermore, ads identified for rendering may be modified during a session and the updated duration associated therewith may be communicated by the MSO 110 to the client device when a trick play is requested or by asynchronous messaging from the MSO 110 to the client device 130. The client device 130 may use the duration information as received as metadata at the beginning or during the session to determine when to terminate an active session, synchronize trick play (e.g., rewind, fast forward, slow reverse, slow forward, jump, jog, etc.) functions during a session, or provide relatively accurate duration information to the user 150.

The MSO 110 may include dynamic advertisement insertion (DAI) system 160 that may include one or more dynamic advertisement insertion (DAI) server(s) 162 and one or more datastores of available advertisements and/or user profiles 164. The MSO 110 may further include a video-on-demand (VOD) system 170 with one or more video-on-demand (VOD) server(s) 172 that may be configured to coordinate the request and delivery of media content requested by the user 150 via his or her client device 130 and client metadata server(s) 174 that may be configured to provide information in the form of metadata, such as media content run time and/or duration metadata to the client device 130.

The DAI server(s) 162 may be configured to determine an inventory of ads available, such as by accessing the datastore 164, media content requested by the user 150, such as via communications with the VOD server(s) 172 and/or the client device 130, and/or a user profile associated with the user 150, such as by accessing the datastore 164. The DAI server(s) 162 may be configured to select ads to be rendered along with a requested media content. The selection of the ads, in example embodiments, may be based at least in part on avails in the media content to be rendered. The avails in the media content may be determined form a mapping of avails of the media content that may be received from the content provider(s) 120 or ascertained from one or more elements of the MSO 110. The selection of the ads may further be based on parameters associated with the user 150 and profile information associated with that user 150. These parameters may include subscription level, client device type, product or service purchase history, user demographics, social media activity, combinations thereof, or the like. The ads identified for the media content to be provided to the user 150 may be pre-roll ads, post-roll ads, interstitial ads, overlay ads, combinations thereof, or the like.

In some cases, the DAI server(s) 162 may be configured to cooperate with an advertising coordinator 180 to select ads to be rendered to the user 150. In some cases, the advertising coordinator 180 may be part of the MSO 110 and, in other cases, the advertising coordinator 180 may be a third party entity. In some example embodiments, the advertising coordinator 180 may be configured to coordinate between an ad buyer (not shown) and the MSO 110. In some example embodiments, the advertising coordinator 180 may be configured to update, such as in real time or on an intermittent basis, the ads that are available for rendering to the user 150. In some cases, these updates may be based at least in part on new ad campaigns to be run by the MSO 110 and/or purchase of new ad placements by one or more ad buyers, such as via the advertising coordinator 180. The ad buyers may be individuals or other entities, such as corporations, non-profit organizations, for-profit organizations, government organizations, public sector organizations, or any of the aforementioned entities located in this country or foreign countries that may be able to direct the purchase of ad assets and/or provide ads, or components thereof.

The DAI server(s) 162 may further be configured to determine a total run length or duration of media content with embedded ads to be rendered to the user 150. This duration may be determined by identifying and summing the duration of the media content and each of the individual ads to be rendered along with the media content. In example embodiments, a head room may be added to the determined duration to ensure, with a relatively high level of certainty, that the duration provided to the client device 130 from the MSO 110 exceeds the duration of the media content, such that the entirety of the media content is rendered to the user 150 without the session being terminated prematurely by the client device 130. The DAI server(s) 162 may further provide the duration information to one or more other elements of the MSO 110, such as the VOD server(s) 172 and/or the client metadata server(s) 174.

In some example embodiments, the DAI server(s) 162 may update the ads to be displayed with the media content while the session is ongoing. In this case, the DAI server(s) 162 may update the duration of the media content with the new ads, as inserted, when there are any modifications in the ads to be inserted. The ads may be modified, in some example embodiments, if new ads are available for insertion and/or if target metrics and/or achieved metrics for one or more ads change while a session is ongoing. If the ads are updated dynamically during the session by the DAI server(s) 162, the DAI server(s) 162 may further be configured to determine a new program duration corresponding to the media content with the new ads identified for rendering to the user 150. The DAI server(s) 162 may further be configured to provide the updated program duration to one or more other entities of the MSO 110, such as the VOD server(s) 172 and/or the client metadata server(s) 174.

The VOD server(s) 172 may be configured to communicate with the client device 130 and coordinate the delivery of media content to the client device 130. The VOD server(s) 172 may be configured, in example embodiments, to receive a request for media content, either directly or indirectly, form the client device 130. Based on the request, the VOD server(s) 172 may determine if the requested media content is to be provided to the client device 130 from which the request originated. The VOD server(s) 172 may further be configured to communicate that the session to provide the requested media content is to be set up to one or more other entities of the MSO 110, such as the DAI server(s) 162 and/or the client metadata server(s) 174. Therefore, the VOD server(s) 172 may initiate a session setup for delivering media content from the MSO 110 to the client device 130 to be rendered to the user 150.

The media content and the content signal associated therewith may be delivered by the MSO 110 to the client device 130 via any suitable network, mechanism, and/or method. For example, the content signal corresponding to the media content, in example embodiments, may be delivered via a content delivery network (CDN) of the MSO 110. The CDN, in example embodiments, may include a variety of elements, including a variety of computing and networking elements, for the distribution of media content, such as the content signals to their corresponding client device 130. One or more elements, such as a video server of the CDN, may be configured to receive instructions and/or direction from the VOD server(s) 172, DAI server(s) 162, and/or the client metadata server(s) 174 for the distribution of content signals to their corresponding client device 130.

The VOD server(s) 172 may further be configured to receive a request for a trick play and responsive to the request for the trick play, the VOD server(s) may be configured to direct providing video content in a manner consistent with the trick play requested. In other words, the content signal provided for the media content to the client device 130 form one or more entities (e.g., video servers, edge servers, etc.) of the MSO 110 may be consistent with the trick play (e.g., normal play, slow motion forward, slow motion reverse, rewind, fast forward, pause, etc.) requested by the client device 130 on behalf of the user 150. In example embodiments, the VOD server(s) 172 may receive updated program duration information form the DAI server(s) 162 prior to a trick play request and may communicate the updated program duration information to the client device 130, either directly or via one or more other entities, such as the client metadata server(s) 174.

Figure 2:
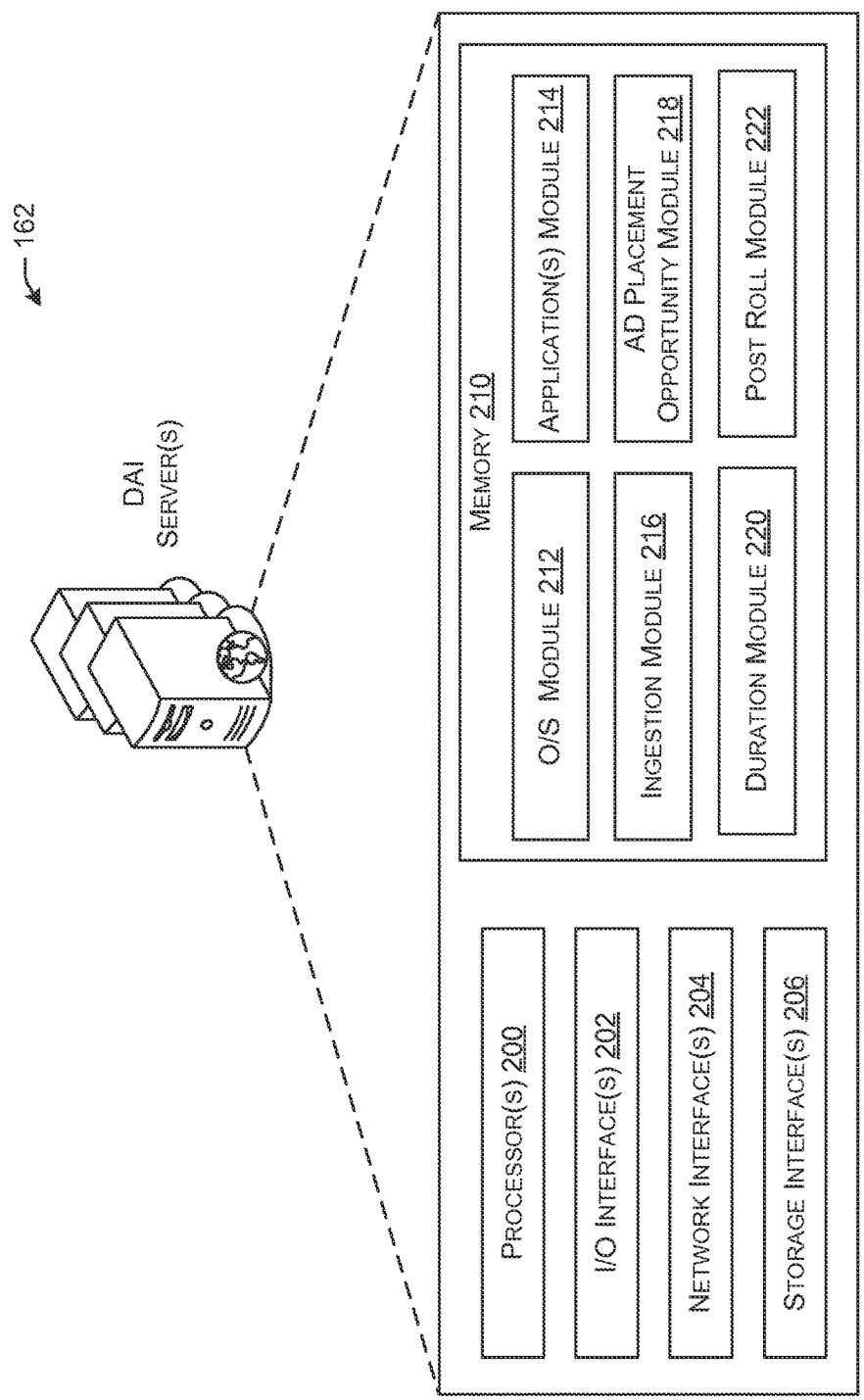
FIG. 2 is a simplified block diagram illustrating an example dynamic advertisement insertion (DAI) server of the environment of FIG. 1 for selecting advertising for a media content to be delivered to the client device, in accordance with certain example embodiments of the disclosure.

FIG. 2 is a simplified block diagram illustrating an example dynamic advertisement insertion (DAI) server 162 of the environment 100 of FIG. 1 for selecting advertisement for a media content to be delivered to the client device 130, in accordance with certain example embodiments of the disclosure.

The DAI server 162 may include one or more processor(s) 200, one or more input/output (I/O) interfaces 202, one or more network interfaces 204, one or more storage interface(s) 206, and one or more memories 210.

The one or more I/O interfaces 202 may enable the use of one or more (I/O) device(s) or user interface(s), such as a keyboard and/or mouse. An administrator may be able to administer the systems and methods disclosed herein by interacting with the DAI server 162 via the I/O interfaces 202. The network interfaces(s) 204 may allow the DAI server 162 to communicate via one or more network(s) and/or via other suitable communicative channels, such as with other elements of the MSO 110 or with the advertising coordinator 180 and/or the content provider(s) 120. The storage interfaces 206 may enable a traffic and billing server to communicate and/or use one or more storage devices, such as, for example the datastore 164.

The processor(s) 200 of the DAI server 162 may be implemented as appropriate in hardware, software, firmware, or combinations thereof. Software or firmware implementations of the processor(s) 200 may include computer-executable or machine-executable instructions written in any suitable programming language to perform the various functions described. Hardware implementations of the processor(s) 200 may be configured to execute computer-executable or machine-executable instructions to perform the various functions described. The one or more processor(s) 200 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The DAI server 162 may also include a chipset (not shown) for controlling communications between one or more processor(s) 200 and one or more of the other components of the DAI server 162. The processor(s) 200 may also include one or more application specific integrated circuits (ASICs) or application specific standard products (ASSPs) for handling specific data processing functions or tasks.

The memory 210 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 210 may store program instructions that are loadable and executable on the processor(s) 200, as well as data generated or received during the execution of these programs. Turning to the contents of the memory 210 in more detail, the memory 210 may include one or more operating systems (O/S) module 212, an applications module 214, an ingestion module 216, an ad placement opportunity module 218, a duration module 220, and a post roll module 2222. Each of the modules and/or software may provide functionality for the DAI server 162, when executed by the processor(s) 200. The modules and/or the software may or may not correspond to physical locations and/or addresses in memory 210. In other words, the contents of each of the modules 212, 214, 216, 218, 220, 222 may not be segregated from each other and may, in fact, be stored in at least partially interleaved positions on the memory 210.

The O/S module 212 may have one or more operating systems stored thereon. The processor(s) 200 may be configured to access and execute one or more operating systems stored in the (O/S) module 212 to operate the system functions of the DAI server 162. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 may contain instructions and/or applications thereon that may be executed by the processor(s) 200 to provide one or more functionality associated with the generation and distribution of zone signals. These instructions and/or applications may, in certain aspects, interact with the (O/S) module 212 and/or other modules of the DAI server 162. The applications module 214 may have instructions, software, and/or code stored thereon that may be launched and/or executed by the processor(s) 200 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The ingestion module 216 may have instructions stored thereon that, when executed by the processor(s) 200, enable the DAI server(s) 162 to perform various functions related to ingestion and evaluation of media content to be provided to a user 150, as well as ads that are available for placement with the available media content. The processor(s) 200 may be configured to receive one or more ads from ad buyers and/or the advertising coordinator 180. The processor(s) 200 may further be configured to the identify attributes of the received and/or identified ads. These attributes of the ads, in some example embodiments, may include information, such as type of ad (e.g. pre-roll, interstitial, or post-roll), ad duration, target demography, target geography, and/or target behavior of the content consumer. In some example embodiments, the attribute information associated with ads received by the DAI server(s) 162 and the processor(s) 200 thereon may be provided by the provider of the ads, such as in the form of metadata received with the ads. In other example embodiments, the ads may be received from the content providers 120 without any targeting information. In these cases, the processor(s) 200 and/or other elements of the MSO 110 may ascribe one or more targeting information (e.g., target demography, geography, and/or behavior) to the received ads. The processor(s) 200, in example embodiments, may further be configured to store the received ads in the datastore 164. In example embodiments, received ads may be stored by the processor(s) 200 in association with their corresponding respective targeting information. For the purposes of this disclosure, demographical targets may include targets pertaining to the number of people in a viewer's household, gender of the viewers, age of the viewers, race of the viewers, religion of the viewers, sexual orientation of the viewers, political views of the viewers, product or service preferences of the viewers, combinations thereof, or the like. The geographic targets may pertain to particular regions, such as particular towns and/or suburbs of a metropolitan area, states, countries, particular area codes, or the like. The behavioral targets of the viewers may include a viewer or a group of viewers for whom the corresponding ad is to be targeted based at least in part on product or service purchase history, content viewing history, ad interaction history, or the like.

In example embodiments, the DAI server(s) 162 and the processor(s) 200 thereon may further be configured to receive and/or identify media content that is to be provided to end users 150 by the MSO 110. In some cases, this media content may be received from the one or more content provider(s) 120. In some example embodiments, the received media content may be received via direct communicative links, such as wire, optical, and/or wireless communicative links between the MSO 110 and the content provider(s) 120. In some example embodiments, the DAI server(s) 162 or other entities of the MSO 110, such as one or more video server(s), may be configured to perform a variety of suitable processing on the received content signal, such as any combination of demodulation, modulation, filtering, enhancing, amplifying, decoding, encoding, decrypting, encrypting, digital rights management (DRM) adjudication, combinations thereof, or the like. The received media content, in example embodiments, may be received along with an ad mapping of ad insert opportunities to indicate where ads may be placed for the received media content. In further example embodiments, the media content may be received with ads pre-embedded therein. In this case, the DAI server(s) 162 may be configured to provide the media content with the pre-embedded ads or to replace the pre-embedded ads with other ads in the MSO's 110 inventory of ads, such as ads targeted for a particular user 150 requesting the media content.

The processor(s) 200, by executing instructions stored in the ad placement opportunity module 218, may be configured to identify and/or direct the placement of ads with media content to be delivered to the user 150. The content signal associated with requested media content to be provided to the user 150 may be generated by taking a received media content and inserting one or more ads into the ad avails or insertion spots associated with that media content. The processor(s) 200 may be configured to determine locations within a requested media content in which ads may be placed (e.g., pre-roll, interstitial, post-roll ads). This information may be ascertained by utilizing a mapping of ad placement opportunities of media content available to the MSO 110 for distribution to one or more client devices 130 associated with one or more users 150. The processor(s) 200 may further be configured to determine which ads, such as from an inventory of ads of the MSO 110, may be presented with particular media content requested by a user 150. For example, a particular ad may be too long in duration or too short in duration for placement in a particular ad spot of a particular media content. As another example, adult content and/or oriented ads may not be placed in media content that may be viewed by children.

In example embodiments, the processors(s) 200, by executing instructions stored in the ad placement opportunity module 218, may be configured to select ads for a particular user 150 based at least in part on information about that user 150. For example, demographical, geographical, and/or historical behavior may be utilized to select from an inventory or select set of ads to be provided to the particular user 150 with media content that is to be delivered to him or her. In these cases, the processor(s) 200 may be configured to match demographic, geographic, and/or user behavior of the user 150 with target demographics, geography, and/or target behaviors associated with ads to be selected for providing to the user 150. In this way, the DAI server(s) 162 may be configured the best ads, in a targeted fashion, for a particular user 150, according to some embodiments of the disclosure.

In some example embodiments, the ads to be delivered to a particular user 150 may be determined prior to session set-up. In other example embodiments, the ads to be provided to a particular user 150 may be determined and/or updated while a session is ongoing. For example, new ads may be available or may have expired after a session has already started. Therefore, the processor(s) 200 may be configured, by executing instructions stored in the ad placement opportunity module 218, to identify new ads that it deems to be worth presenting to the user 150 after the session with the user's client device 130 has already commenced. These newly selected ads may be, for example, better targeted for the particular user 150 or may be part of an ad campaign that is to be promoted by the MSO 110. In this way, the DAI server(s) 162 may be configured to dynamically determine and/or update the ads that are to be provided to users 150 and their respective client devices 130.

In some example embodiments, the processor(s) 200, by executing instructions stored in the duration module 220, may be configured to determine the duration of media content along with ads associated with the media content to be provided to a client device 130 for rendering to the user 150. In example embodiments, the processor(s) 200 may have access to the run time of the media content and each of the ads to be provided to the user 150. This information of duration of media content and/or ads may be accessed from one or more datastores, such as datastores of available advertisements and/or user profiles 164. The duration of the requested media content and the ads identified to be provided with the requested media content may be determined by summing the duration of the media content and each of the identified ads. As a result, the processor(s) 200 may be configured to provide a relatively precise duration of a content signal including the media content and the identified ads to be delivered to the client device 130 for rendering to the user 150 may be determined. The DAI server(s) 162 and the processor(s) 200 thereon may be configured to provide this duration information to one or more other entities of the MSO 110, such as the VOD server(s) 172. In some cases, the DAI server(s) 162 may be configured to provide this duration information as metadata along with the identification of the ads to be inserted in the media content to be delivered to the client device 130.

In example embodiments, the processor(s) 200 may add a time margin on to the determined duration of the media content and ad insertions. This time margin may be added on to ensure with a relatively high confidence level that the duration that is provided to the client device 130, such as in the form of metadata from the VOD server(s) 172, is not shorter than the actual duration of the media content and the ads that are to be rendered to the user 150. This may because, in some example embodiments, the client device 130 may terminate a session based at least in part on the duration information of the media content and inserted ads placed therein. Therefore, by adding a time margin to the actual duration of the media content and ads, as supplied as a media content signal to the client device 130, the client device 130 is unlikely to terminate the session prematurely. Therefore, by adding a margin to the determined duration information, the processor(s) 200 can ensure that if that duration information is used by the client device 130 to terminate the session, the media content, in its entirety, is likely to be rendered to the user 150. Furthermore, the additional time margin added to the actual duration may ensure with a relatively high level of certainty that even if the ads to be rendered are dynamically updated after the start of a session and new duration information is not communicated to the client device 130, the client device would still receive all of the media content requested by the user 150 and would not terminate the session prematurely. In addition to preventing premature termination of a session by the client device 130, the time margin may allow for an overestimation, rather than an underestimation of the duration and time remaining as presented to the user 150 while a session is ongoing for the client device 130 in rendering the requested media content, as received from the MSO 110. This may result in a relatively improved user experience for the user 150 consuming the media content. The additional time margin may be any suitable fixed time, such as, for example, 5 minutes, or any suitable percentage of the calculated durations, such as, for example, 5%.

In further example embodiments, the DAI server(s) 162 and processor(s) 200 thereon, by executing the instructions store in the duration module 220, may be configured to update the duration if the ads to be provided with the requested media content are to be updated dynamically or when a session is ongoing (e.g., when the media content is being delivered to the client device 130). The processor(s) 200 may, therefore, update the duration with new information related to ads to be rendered to the user 150 along with the media content requested by the user 150. As discussed above, this updated duration value may, in example embodiments, include additional time margin. Additionally, the determined duration may be communicated to the client device and/or other entities of the MSO 110, such as the VOD server(s) 172. The processor(s) 200 may be configured to provide the duration information, in example embodiments, as metadata that is provided along with ads to be inserted into the requested media content.

It will be appreciated that in some cases, a particular session may be commenced prior to identification of the ads that are to be presented to the user 150 during that session. In other words, the DAI server(s) 162 and the processor(s) 200 thereon, along with other entities of the MSO 110, may be configured dynamically identify the ads to be provided to the user 150 via his/her client device 130 while the session is active. In this case, the DAI server(s) 162 may not know the exact duration of the media content signal that is to be delivered to the client device 130 before the start of the session. As a result, the processor(s) 200, by executing the instructions in the duration module 220, may be configured to determine an estimated maximum duration of the media content along with ads that may be presented therewith. This estimated maximum duration may be determined based at least in part on the duration of the media content without any ad insertions, as well as, ad insertion opportunities associated with the media content. For example, the processor(s) 200 may be configured to determine the estimated maximum duration by summing the duration of the ad-free media content with the maximum possible time of an ad for each of the ad insertion opportunities of the media content. It will be appreciated that the actual duration may be relatively less than the estimated maximum duration, since an ad may not be placed in every one of the ad insertion opportunities associated with the media content and the maximum allowed time of the ad insertion opportunities may not be fully used when providing the media content signal to the client device 130 during the user's session. In other example embodiments, the estimated maximum duration may be determined by adding a time margin, such as, for example, 5 minutes, to the ad-free duration of the media content or adding a percentage time margin, such as, for example, 15%, to the ad-free duration of the media content.

The processor(s) 200, by executing instructions stored in the post roll module 222, may further be configured to select and/or provide one or more post roll content to render after the media content, as delivered by the MSO 110 to the client device, has concluded. The remaining duration, as provided to client device 130 that may overestimate the duration of the media content and embedded ads, may be filled with a variety of post roll content, such as ads, movie trailers, other available media content, product or service previews and/or reviews, news, weather, financial quotes, other information, or the like. In example embodiments, the processor(s) may be configured to select post roll content from an inventory of post roll content available to the MSO 110, such as post roll content stored and/or catalogued in a datastore, such as datastore 164. The selected post roll content, in example embodiments, may be selected such that it extends at least the anticipated additional time that the session may be active past the rendering of the media content and the selected ads. In some cases, the post roll time may be approximately greater than the time margin that was added on to the determined duration of the media content. In some cases, the session may extend a total time of the estimated maximum duration, as provided by the processor(s) 200. In this case, the post roll content may be selected such that the post roll content may consume all of the time difference between the estimated maximum duration and the actual duration of the media content and the ads to be shown. Once the post roll content is selected, the processor(s) may be configured to provide an indication of the selected post roll content to one or more other entities of the MSO 110, such as the VOD server(s) 172 or other entities that may cooperate in the delivery of the post roll content from the MSO 110 to the client device 130.

It will be appreciated that there may be overlap in the functionality of the instructions stored in the operating systems (O/S) module 212, the applications module 214, the ingestion module 216, the ad placement opportunity module 218, the duration module 220, and the post roll module 222. In fact, the functions of the aforementioned modules 212, 214, 216, 218, 220, 222 may interact and cooperate seamlessly under the framework of the traffic and billing server 160. Indeed, each of the functions described for any of the modules 212, 214, 216, 218 may be stored in any module 212, 214, 216, 218 in accordance with certain embodiments of the disclosure. Further, in certain embodiments, there may be one single module that includes the instructions, programs, and/or applications described within the O/S module 212, the applications module 214, the ingestion module 216, the ad placement opportunity module 218, the duration module 220, and the post roll module 222.

Figure 3:
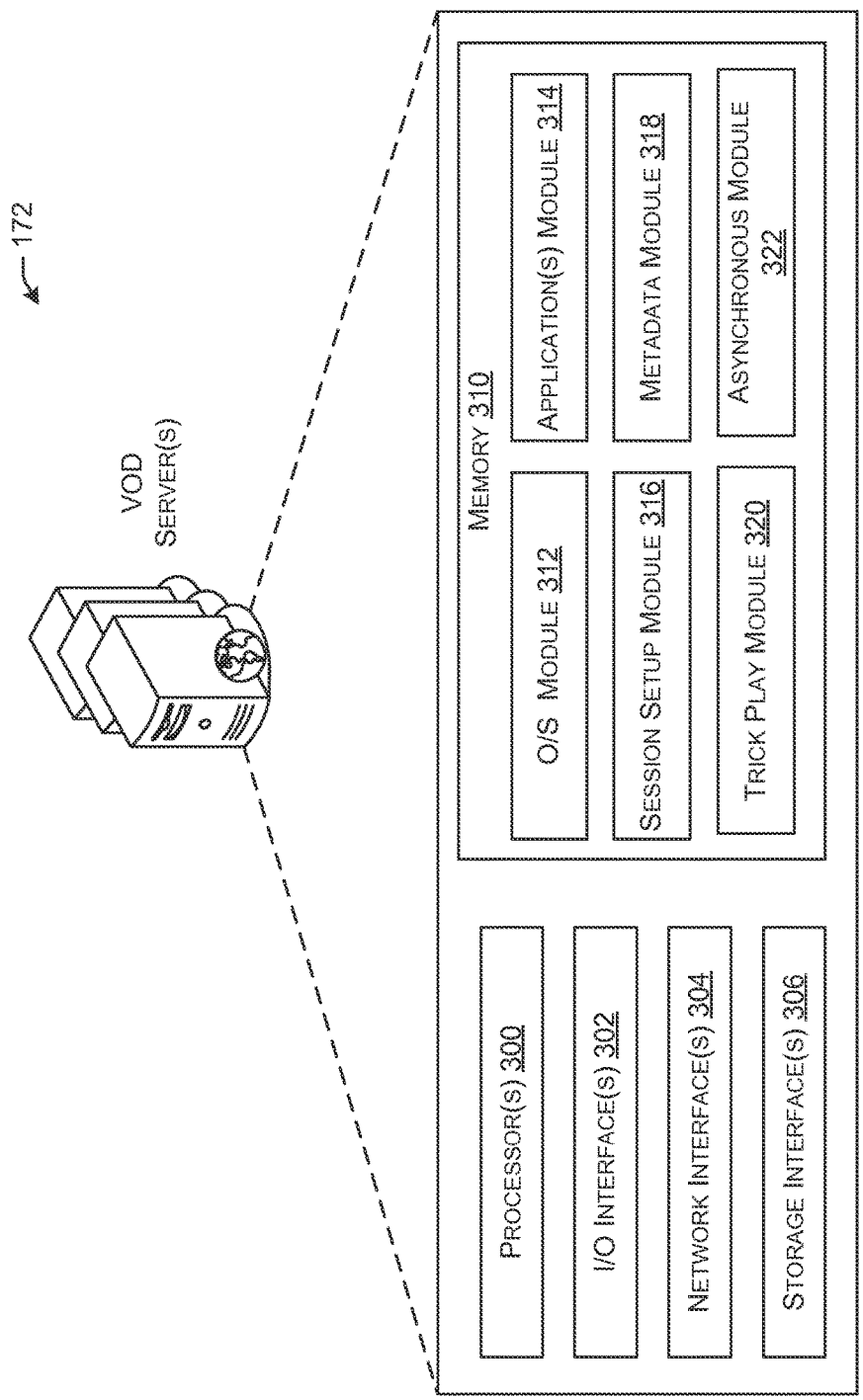
FIG. 3 is a simplified block diagram illustrating an example of a video-on-demand (VOD) server of the environment of FIG. 1 for providing content signal associated with content to be delivered to the client device along with metadata associated with the content signal, in accordance with certain example embodiments of the disclosure.

FIG. 3 is a simplified block diagram illustrating an example of a video-on-demand (VOD) server 172 of the environment of FIG. 1 for providing content signal associated with content to be delivered to the client device 130 along with metadata associated with the content signal, in accordance with certain example embodiments of the disclosure.

The VOD server(s) 172 may include one or more processor(s) 300, one or more input/output (I/O) interfaces 302, one or more network interfaces 304, one or more storage interface(s) 306, and one or more memories 310. The description of these elements may be substantially similar to the description of the one or more processor(s) 200, one or more input/output (I/O) interfaces 202, one or more network interfaces 204, one or more storage interface(s) 206, and one or more memories 210 of the DAI server(s) 162 as described in FIG. 2 and, therefore, in the interest of brevity, the descriptions will not be repeated here.

The memory 310 may store program instructions that are loadable and executable on the processor(s) 300, as well as data generated or received during the execution of these programs. Turning to the contents of the memory 310 in more detail, the memory 310 may include one or more operating systems (O/S) module 312, an applications module 314, a session setup module 316, a metadata module 318, a trick play module 320, and an asynchronous module 322. Each of the modules and/or software may provide functionality for the VOD server(s) 172, when executed by the processor(s) 300. The modules and/or the software may or may not correspond to physical locations and/or addresses in memory 310. In other words, the contents of each of the modules 312, 314, 316, 318, 320, 322 may not be segregated from each other and may, in fact be stored in at least partially interleaved positions on the memory 310.

The description of the O/S module 312 and the application(s) module 314 may be substantially similar to the description of the O/S module 212 and the application(s) module 214, respectively, of the DAI server(s) 162 of FIG. 2 and, in the interest of brevity, will not be repeated here.

The session setup module 316 may have instructions stored thereon that, when executed by the processor(s) 300, enable the VOD server(s) 172 to perform various functions related to setting up a session. The processor(s) 300 may be configured to receive a request for media content from the client device 130 on behalf of the user 150. The processor(s) 300 may further be configured to determine if the requested media content may be provided to the user 150 via his/her client device 130. This may entail determining, for example, the user's subscription level and/or other media access level with the MSO 110. If the user 150 is deemed to be eligible to receive the media content requested, then the processor(s) 300 may be configured to establish a session with the client device 130 to provide the requested media content to the user 150. In example embodiments, the processor(s) 300 may indicate the requested media content to one or more other entities of the MSO 110, such as the DAI server(s) 162.

In some example embodiments, the processor(s) 300 may further be configured to receive, from the DAI server(s) 162, an estimated maximum duration of the requested media content. As discussed above, the estimated maximum duration of the media content may be based at least in part on the ad-free duration of the requested media content and the estimated or actual maximum duration of the ad insert opportunities of the media content, in some cases. In other cases, the estimated maximum duration may be determined by adding a time margin and/or a percentage duration margin on to the ad-free media content duration. Still, in other cases, the estimated maximum duration may be based on adding a time or percentage margin onto a duration determined by summing the media content duration with the duration of ads to be inserted with the media content. In this last case, the time margin may be added to the actual calculated duration of the media content with the identified ads to accommodate any changes in the identified ads to be provided with the media content. This value of the estimated maximum duration may represent a maximum time that a session may last such that the requested media content (e.g., the entertainment portion of the media content signal transmitted to the client device 130) is rendered to the user 150, in its entirety, regardless of the ads that are inserted in the ad insert opportunities of the media content. In other example embodiments, an actual duration of the media content, along with ads selected for insertion with the media content may be received.

The processor(s) 300 may further be configured to provide the client device 130 with metadata that is to be used for establishing the session for transmission of the requested media content from the MSO 110 to the client device 130. In example embodiments, the metadata, including providing the estimated maximum media content duration may be provided either directly by the VOD server(s) 172 or via one or more other elements of the MSO 110, such as client metadata server(s) 174, to the client device 130. During session setup, this metadata may be provided as part of session setup protocol (SSP) metadata. This SSP metadata, in addition to the media content duration or estimated maximum media content, as determined by the DAI server(s) 162 or the VOD server(s) 172, may further include other information related to the media content, such as asset information, modulation information, and/or tuning information (e.g., quadrature amplitude modulation (QAM) channel information).

The metadata module 318 may have instructions stored therein that may be executed by the processor(s) 300 to provide functionality associated with generating a variety of metadata to be communicated to the client device 130, either directly or via intermediary elements, such as the client metadata server(s) 174. In the case of session setup, the processor(s) may be able to generate the appropriate metadata, such as SSP metadata. In the case of duration update during a trick play request, the processor(s) 300 may be configured to provide new or updated session related metadata, including updated duration information. This may be provided, in example embodiments, as modified response to a LSC protocol, RSTP, or the like message received from the client device. In the case of an asynchronous update to duration information provided to the client device, the processor(s) may further be configured to generate and transmit the appropriate metadata. In example embodiments, metadata may be transmitted in the form of MQTT message(s), XMPP message(s), or the like.

The trick play module 320 may have instructions stored thereon that, when executed by the processor(s) 300, enable the VOD server(s) 172 to perform various functions related to handling a trick play request from the client device 130 and providing the client device 130 with updated duration information. In example embodiments, the processor(s) 300 may provide a message containing metadata to handle the requested trick play from the client device 130. In example embodiments, the processor(s) may generate, modify, and/or update a response to a light streaming control (LSC) protocol message, RTSP message, or similar message, as received and/or transmitted for invoking a trick play (e.g., fast forward, rewind, pause, stop, etc. of VOD media content). In other words, the response to a request for a trick play may be intercepted and updated with the latest estimate of the media content duration.

The asynchronous module 322 may have instructions stored thereon that, when executed by the processor(s) 300, enable the VOD server(s) 172 to perform various functions related to transmitting a message from the MSO 110 to the client device with updated duration information of the media content signal. The processor(s) 300, in example embodiments, may provide asynchronous updates of the duration of the media content and the ads to be rendered along with the media content. These updates may be directed by the processor(s) 330 and the VOD server(s) 172 and communicated by any element of the MSO 110 to the client device 130 via one or more messages, such as messages encoded as extensible messaging and presence and protocol (XMPP), MQ Telemetry Transport (MQTT), and/or extensible markup language (XML). In some example embodiments, the ads to be rendered to the user may be updated dynamically while a session is ongoing. Therefore, in these example embodiments, if the DAI server(s) 162 dynamically change (e.g., change while the session is ongoing) the ads that are to be rendered with the media content requested by the user 150, then the processor(s) 300 may be configured to provide an updated duration that may be communicated to the client device 130 via an asynchronous message. In example embodiments, the processor(s) 300 may generate the asynchronous message. In other example embodiments, the processor(s) 300 may direct the generation of the asynchronous message.

It will be appreciated that there may be overlap in the functionality of the instructions stored in the operating systems (O/S) module 312, the applications module 314, the session setup module 316, the metadata module 318, the trick play module 320, and the asynchronous module 322. In fact, the functions of the aforementioned modules 312, 314, 316, 318, 320, 322 may interact and cooperate seamlessly under the framework of the VOD server(s) 172. Indeed, each of the functions described for any of the modules 312, 314, 316, 318, 320, 322 may be stored in any module 312, 314, 316, 318, 320, 322 in accordance with certain embodiments of the disclosure. Further, in certain embodiments, there may be one single module that includes the instructions, programs, and/or applications described within the operating systems (O/S) module 312, the applications module 314, the session setup module 316, the metadata module 318, the trick play module 320, and the asynchronous module 322.

Figure 4:
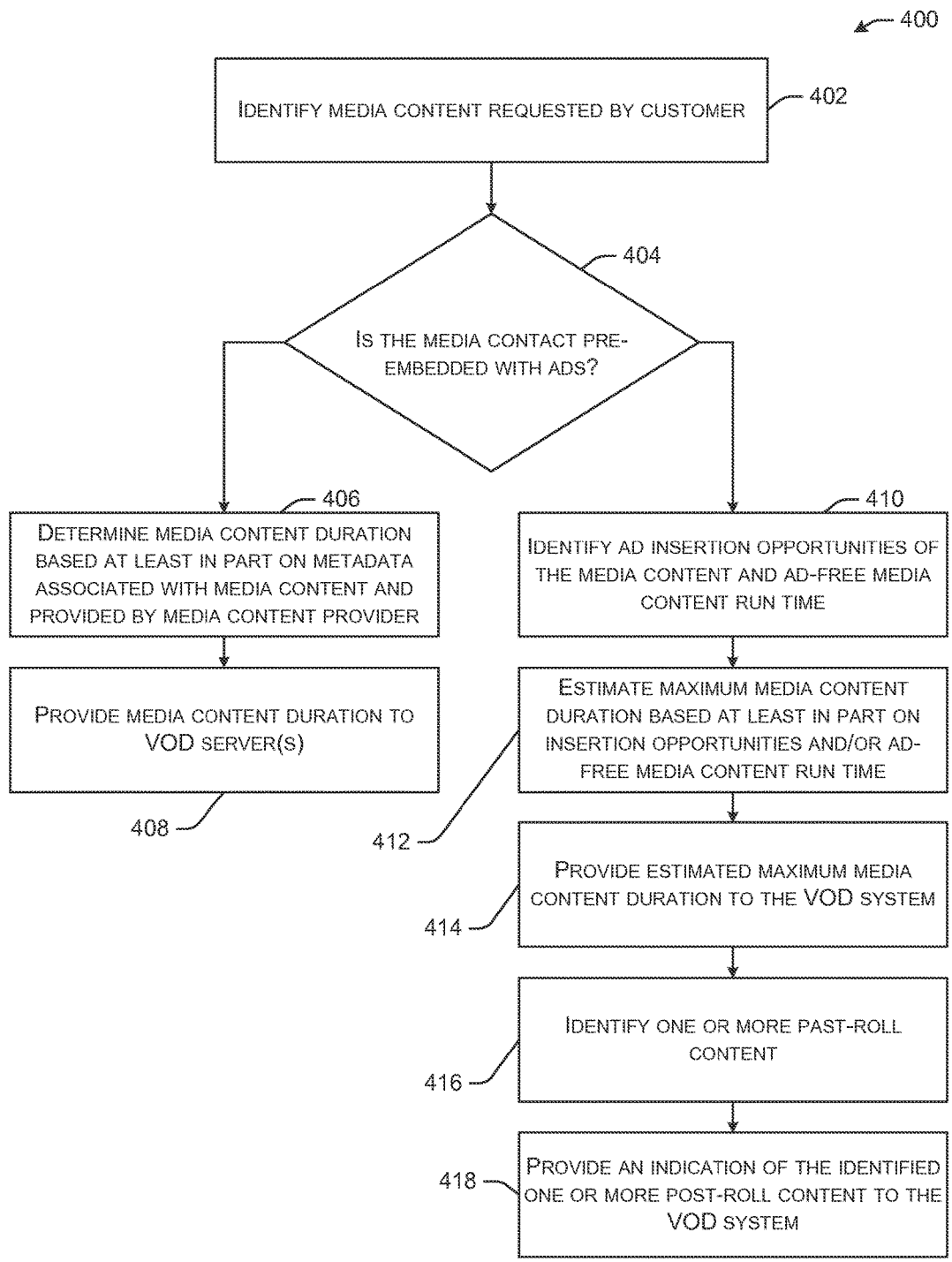
FIG. 4 is a flow diagram illustrating an example method for providing content duration metadata of content to be provided to the client device, in accordance with certain example embodiments of the disclosure.

FIG. 4 is a flow diagram illustrating an example method 400 for providing content duration metadata of media content to be provided to the client device 130, in accordance with certain example embodiments of the disclosure. This method 400 may be performed by the DAI server(s) 162 and the processor(s) 200 thereon, in example embodiments, in cooperation of the VOD server(s) 172 and/or other entities of the MSO 110. At block 402, a media content requested by the user may be identified. The media content may be any suitable content including, but not limited to, video content, audio content, gaming content, interactive content, video-on-demand (VOD) content, movies-on-demand (MOD) content, combinations thereof, or the like. The requested media content may be selected by the user 150 by interacting with the client device 130. In example embodiments, the client device 130 may render a media content directory from which the user 150 may be able to select media content that he/she wishes to view.

At block 404, it may be determined if the media content is pre-embedded with ads. If it is determined that the media content is pre-embedded with ads, then at block 406, the media content duration may be determined based at least in part on metadata associated with the media content and provided by the media content provider. In this case, the pre-embedded ads may be rendered to the user 150 as-received from the from the media content provider(s) 120, such as a broadcaster. At block 408, the media content duration may be provided to the VOD server(s) 172. In this case, the actual media content duration may be known. In other cases, a slightly increased media content duration may be provided, in which case, there is opportunity for any dynamic updates to the ads inserted in the media content without the media content signal exceeding the provided estimated duration.

At block 404, if it was determined that the media content is not pre-embedded with ads, the method 400 may proceed to block 410, where ad insertion opportunities of the media content and the ad-free content run time may be identified. The ad insertion opportunities, in example embodiments, may be received the MSO 110 as a mapping along with the media content, such as from the content provider(s) 120. In other example embodiments, the ad insertion opportunities may be determined by one or more entities of the MSO 110, such as the DAI server(s) 162. In some example embodiments, the ad insertion opportunities may be temporal locations before, within, or after the media content where it may be suitable to place one or more ads, sometimes of prescribed type and/or duration. The ad-free media content run time may also be received from the source of the media content or determined by entities of the MSO 110.

At block 412, a maximum duration of the media content may be estimated based at least in part on the identified insertion opportunities and/or the ad-free content run time. determine an estimated maximum duration of the media content along with ads that may be presented therewith. This estimated maximum duration may be determined based at least in part on the duration of the media content without any ad insertions, as well as, ad insertion opportunities associated with the media content. For example, the processor(s) 200 may be configured to determine the estimated maximum duration by summing the duration of the ad-free media content with the maximum possible time of an ad for each of the ad insertion opportunities of the media content. It will be appreciated that the actual duration may be relatively less than the estimated maximum duration, since an ad may not be placed in every one of the ad insertion opportunities associated with the media content and the maximum allowed time of the ad insertion opportunities may not be fully used when providing the media content signal to the client device 130 during the user's session. In other example embodiments, the estimated maximum duration may be determined by adding a time margin, such as, for example, 15 minutes, to the ad-free duration of the media content or adding a percentage time margin, such as, for example, 15%, to the ad-free duration of the media content.

At block 414, the estimated maximum media content duration may be provided to the VOD server(s). This estimated maximum media content duration may be communicated directly to the VOD server(s) 172 or via one or more intermediaries by the processor(s) 200.

At block 416, one or more post-roll content may be identified. select and/or provide one or more post roll content to render after the media content, as delivered by the MSO 110 to the client device, has concluded. The remaining duration, as provided to client device 130 that may overestimate the duration of the media content and embedded ads, may be filled with a variety of post roll content, such as ads, movie trailers, other available media content, product or service previews and/or reviews, news, weather, financial quotes, other information, or the like. In example embodiments, the processor(s) 200 may be configured to select post roll content from an inventory of post roll content available to the MSO 110, such as post roll content stored and/or catalogued in a datastore, such as datastore 164. The selected post roll content, in example embodiments, may be selected such that it extends at least the anticipated additional time that the session may be active past the rendering of the media content and the selected ads. In some cases, the post roll time may be approximately greater than the time margin that was added on to the determined duration of the media content. In some cases, the session may extend a total time of the estimated maximum duration, as provided by the processor(s) 200. In this case, the post roll content may be selected such that the post roll content may consume all of the time difference between the estimated maximum duration and the actual duration of the media content and the ads to be shown. Once the post roll content is selected, the processor(s) 200 may be configured to provide an indication of the selected post roll content to one or more other entities of the MSO 110, such as the VOD server(s) 172 or other entities that may cooperate in the delivery of the post roll content from the MSO 110 to the client device 130. At block 418, an indication of the one or more post-roll content may be provided to the VOD server(s).

It should be noted, that the method 400 may be modified in various ways in accordance with certain embodiments of the disclosure. For example, one or more operations of method 400 may be eliminated or executed out of order in other embodiments of the disclosure. Additionally, other operations may be added to method 400 in accordance with other embodiments of the disclosure.

Figure 5:
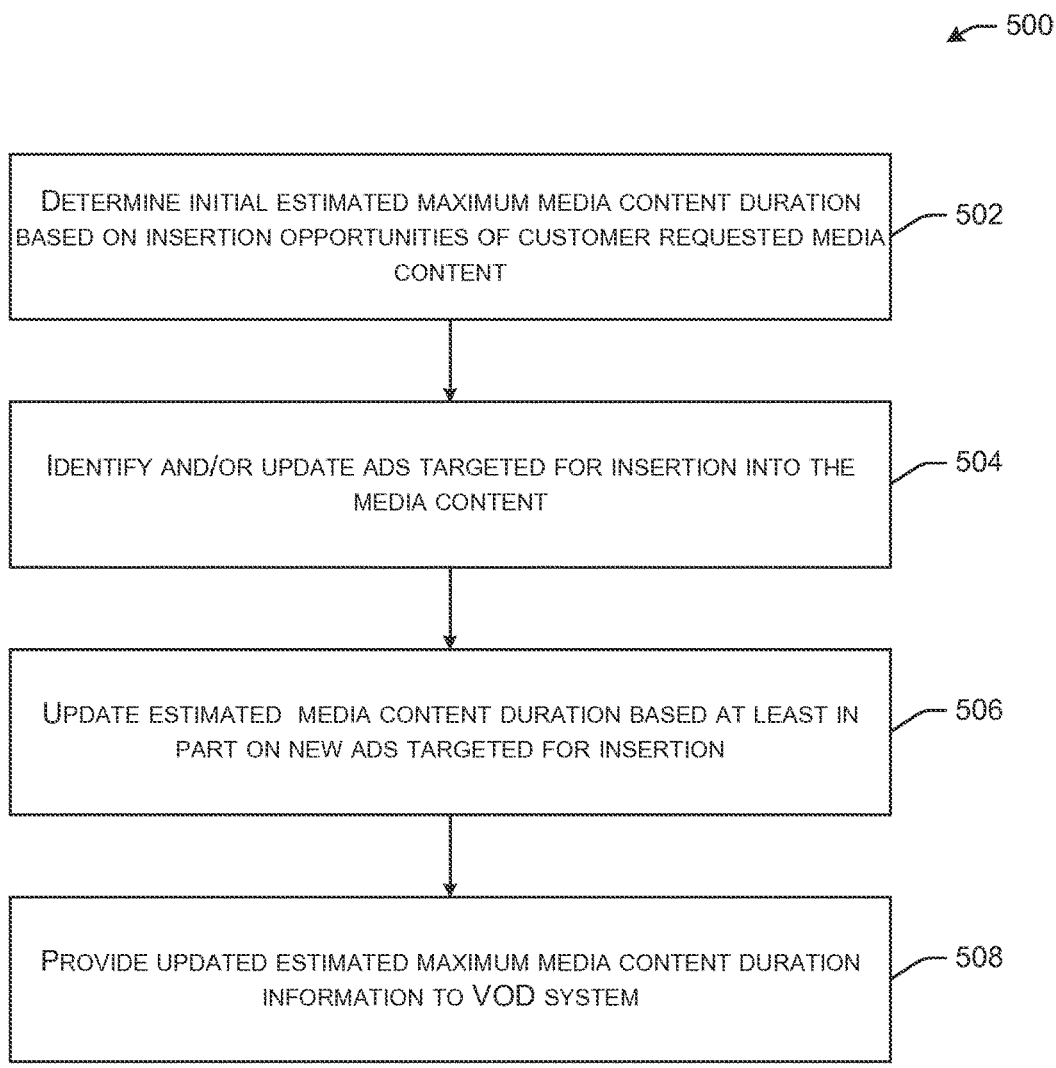
FIG. 5 is a flow diagram illustrating an example method for updating content duration metadata, and directing the transmission of media content signals, in accordance with certain example embodiments of the disclosure.

FIG. 5 is a flow diagram illustrating an example method 500 for updating content duration metadata, and directing the transmission of the media content signals, in accordance with certain example embodiments of the disclosure. This method 500, in example embodiments, may be performed by the DAI server(s) 162 and the processor(s) 200 thereon in cooperation with one or more other entities of the MSO 110, such as the VOD server(s) 172. At block 502, initial estimates of the maximum media content duration may be determined based at least in part on the insertion opportunities of the user requested media content. This process may be similar to the process of block 412 of method 400 of FIG. 4.

At block 504, ads targeted for insertion into the media content may be identified and/or updated. These targeted ads may be identified, in example embodiments, while the current session is in progress. As a result, it may be possible to determine a more accurate estimated duration of the media content signal or the signal that carries the media content and the targeted ads from the MSO 110 to the client device 130. In example embodiments, each of these targeted ads may be targeted for a particular ad insertion opportunity of the media content. The targeting of ads and/or updating of ads that were previously updated may be based at least in part on a user profile of the user 150. For example ads may be targeted based on the users 150 demography, location, previous purchases, and/or previous online experiences or actions. The ads may further be updated based at least in part on the At block 506, the estimated media content duration may be updated based at least in part on identified targeted ads. This updated media content duration may be the actual media content duration or at least a truer representation of the actual media content duration associated with the media content signal carrying the media content and the targeted ads. This updated media content duration may be closer to the actual and/or final media content duration because it is based at least in part on the duration of one or more ads identified for insertion into the media content to be provided to the user 150 via his/her client device. The DAI server(s) 162 and the processor(s) 200 may still make further updates to the ads selected for insertion with the requested media content based on a variety of factors, such as, for example, user demographics, geography, purchase history, behavior, client device type, current ad campaigns of the MSO 110, recent expiration of ads, and/or new ads added to inventory of ads to be provided to customers of the MSO 110. Each time the ads to be inserted with the media content are updated, a relatively more accurate to the final duration of the media content signal may be determined.

At block 508, the updated estimated media content duration may be provided to the VOD system. In example embodiments, the updated estimated media content duration may be a more recent or fresher estimate of the media content signal duration based on the latest ads to be identified for being provided along with the user requested media content. This updated estimated duration is of the media content signal that carries the user requested media content along with the ads identified to be provided to the user 150 via his/her client device 130.

It should be noted, that the method 500 may be modified in various ways in accordance with certain embodiments of the disclosure. For example, one or more operations of method 500 may be eliminated or executed out of order in other embodiments of the disclosure. Additionally, other operations may be added to method 500 in accordance with other embodiments of the disclosure.

Figure 6:
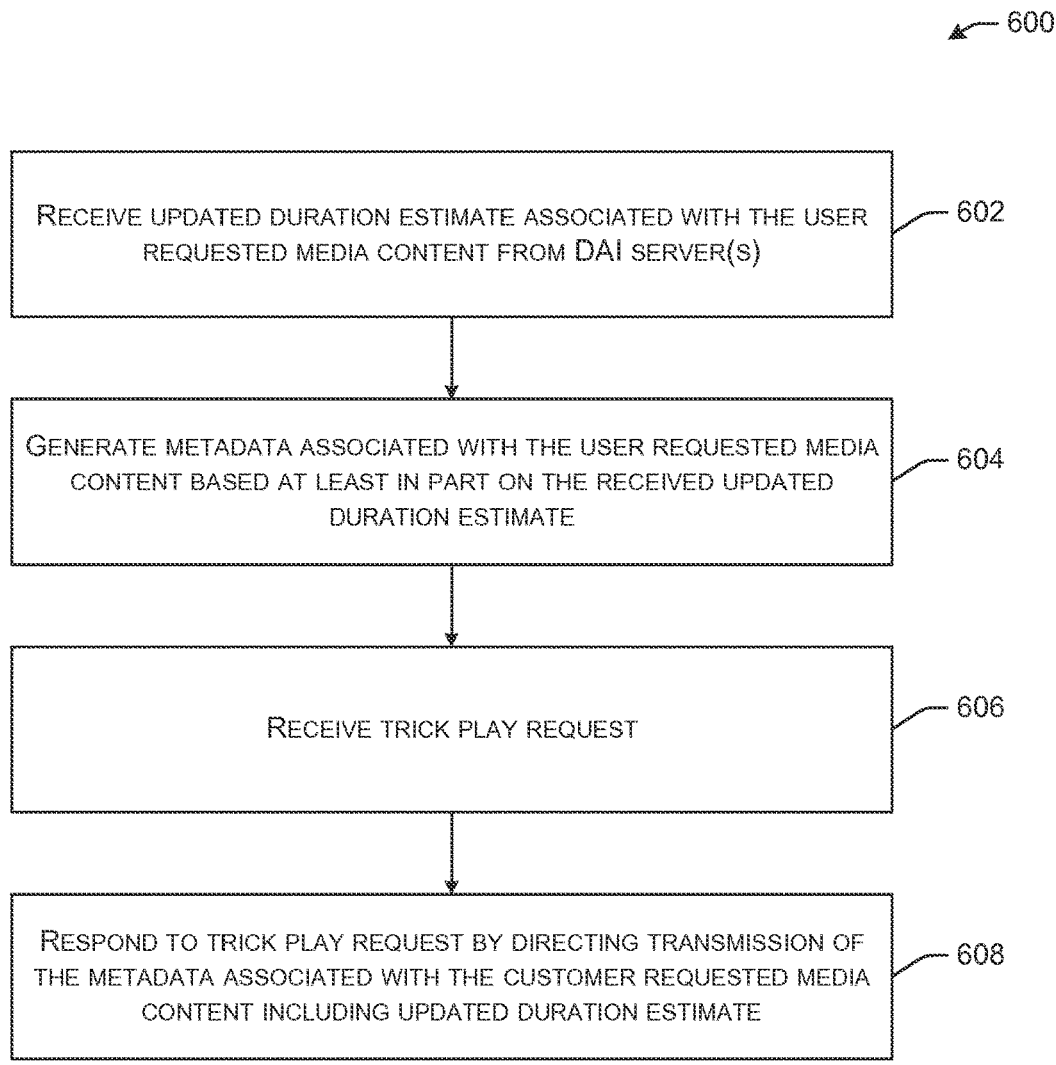
FIG. 6 is a flow diagram illustrating an example method for updating media content duration metadata responsive to a trick play request from the client device, in accordance with certain example embodiments of the disclosure.

FIG. 6 is a flow diagram illustrating an example method 600 for updating content duration metadata responsive to a trick play request from the client device 130, in accordance with certain example embodiments of the disclosure. This method 600 may be performed by the VOD server(s) 172 and the processor(s) 300 thereon in cooperation with other entities of the MSO 110, such as the DAI server(s) 162. Prior to performing this method 600, the VOD server(s) 172 may have already initiated a session with the client device 130 by providing metadata, such as SSP metadata, to establish the session. This metadata may include an initial estimate of the duration of the media content signal, where the media content signal carries the media content and any targeted ads from the MSO 110 to the client device 130 responsive to the request for media content form the client device 130.

At block 602, updated estimated duration associated with user requested media content may be received from the DAI server(s). This updated estimated duration and/or updated maximum duration information may be generated by the DAI server(s) 162 while the session with the client device 130 is ongoing. The DAI server(s) 162 may determine ads to insert into ad insertion opportunities of the media content that is delivered to the client device 130. As this new ad insertion information is determined, the DAI server(s) 162 may provide and the VOD server(s) 172 may receive updated duration information associated with the media content signals carrying the user requested media content and ads to be inserted therein. This updated estimated duration may be closer to the actual duration or a better estimate of the maximum estimated duration of the media content signal delivered from the MSO 110 to the client device 130. It should be noted that the DAI server(s) 162 may transmit a new updated estimated duration whenever ads are updated or new ads are identified for insertion into the media content to be delivered to the client device 130. Therefore, the VOD server(s) 172 may receive updated estimated durations of media content that may be delivered to the user device 130 via an ongoing session.

At block 604, metadata associated with the user requested media content may be generated based at least in part on the received updated estimated duration. This metadata may include other items other than the duration. At block 606, a trick play request may be received. The trick play request may be transmitted by the client device 130 on behalf of the user 150 and may request any one of fast forward, rewind, pause, stop, etc. of the media content being provided to the client device 130 form the MSO 110. It will be appreciated that in certain example embodiments, the metadata based on the most recent duration estimates may be generated by the VOD server(s) after receiving the trick play request.

At block 608, a response to the trick play request may be provided by directing transmission of the metadata associated with the user requested media content including the updated estimated duration. This metadata may be transmitted directly from the VOD server(s) 172 or via an intermediary, such as the client metadata server(s) 174.

It should be noted, that the method 600 may be modified in various ways in accordance with certain embodiments of the disclosure. For example, one or more operations of method 600 may be eliminated or executed out of order in other embodiments of the disclosure. Additionally, other operations may be added to method 600 in accordance with other embodiments of the disclosure.

Figure 7:
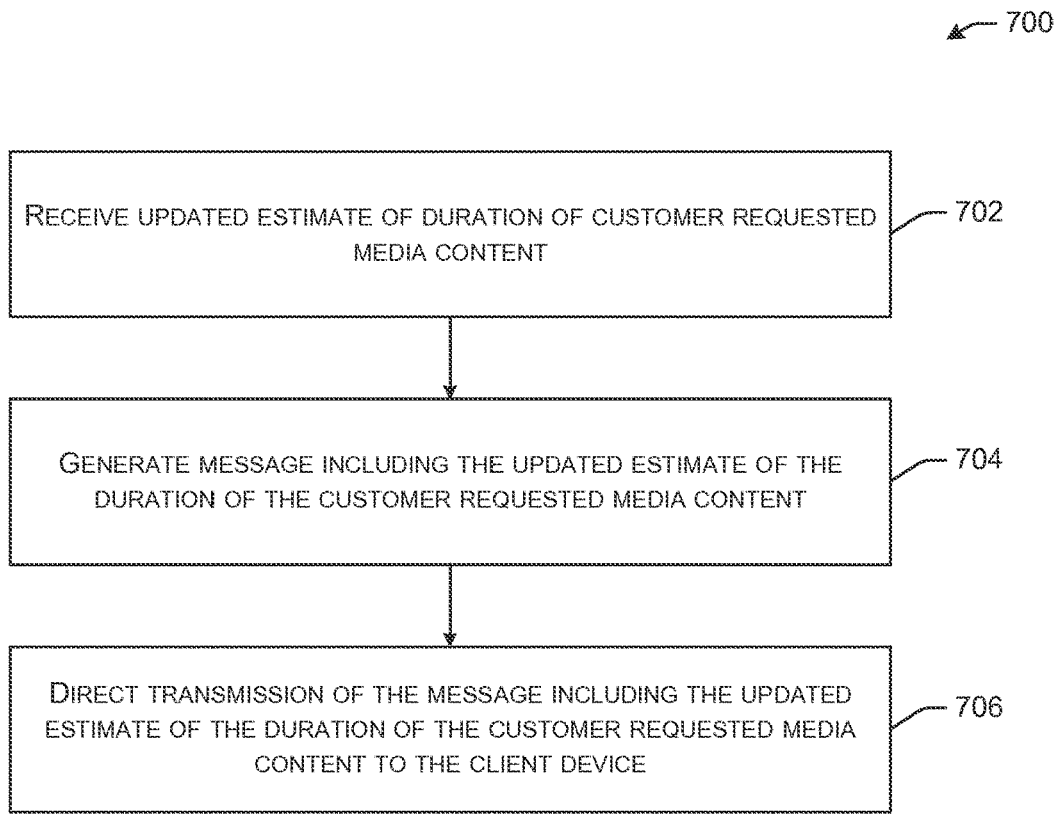
FIG. 7 is a flow diagram illustrating an example method for updating content duration metadata using asynchronous messages to the client device, in accordance with certain example embodiments of the disclosure.

FIG. 7 is a flow diagram illustrating an example method 700 for updating content duration metadata using asynchronous messages to the client device 130, in accordance with certain example embodiments of the disclosure. This method 700 may be performed by the VOD server(s) 172 and the processor(s) 300 thereon in cooperation with other entities of the MSO 110, such as the DAI server(s) 162.

At block 702, an updated estimate of duration of customer requested media content may be received. This process may be similar to block 602 of method 600 of FIG. 6. At block 704, a message including the updated estimate of the duration of the customer requested media content may be generated. This message may be in any suitable format including, but not limited to, MQTT, XMPP, or the like. At block 706, transmission of the message including the updated estimate of the duration of the customer requested media content to the client device may be directed. This message may be transmitted either directly from the VOD server(s) 172 to the client device 130 or via one or more intermediaries. It will be appreciated that the method 700 may be an asynchronous method of providing updated media content signal duration information from the MSO 110 to the client device 130.

It should be noted, that the method 700 may be modified in various ways in accordance with certain embodiments of the disclosure. For example, one or more operations of method 700 may be eliminated or executed out of order in other embodiments of the disclosure. Additionally, other operations may be added to method 700 in accordance with other embodiments of the disclosure.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:
1. A method, comprising:
 receiving, by a video system comprising one or more computer processors from a client device, a request for a media content;
 receiving, by the video system from an advertisement system, an estimated duration associated with a media content signal associated with the media content to be delivered to a client device, wherein the estimated duration is based at least in part on:
  a first duration of the media content, and
  a time estimate of the advertisement insertion opportunities within the media content;
 generating, by the video system, metadata associated with the media content signal based at least in part on the estimated duration associated with the media content signal;
 initiating, by the video system, a session with the client device to provide the media content signal associated with the media content, wherein initiating the session with the client device comprises providing the client device with the metadata associated with the media content signal;

receiving, by the video system, an identification of a post-roll content to be provided to the client device after a conclusion of the media content;

determining, by the video system, a time interval based at least upon a time difference calculated between:
the estimated duration, and
an actual duration of the media content, wherein the actual duration is a sum of the first duration of the media content and a second duration of advertisement insertion opportunities within the media content;

selecting, by the video system, the post-roll content based at least in part on the determined time interval, wherein the post-roll content extends at least the entire determined time interval; and directing, by the video system, a transmission of the post-roll content to the client device.

2. The method of claim 1, wherein the estimated duration is an estimate of the maximum duration of the media content signal based at least in part on the duration of the media content and the time estimate of the advertisement insertion opportunities prior to identifying advertisements corresponding to one or more of the advertisement insertion opportunities.

3. The method of claim 1, wherein the estimated duration is a first estimated duration and the method further comprises receiving, by the video system, a second estimated duration of the media content signal from the advertisement system, wherein the second estimated duration is based at least in part on the duration of the media content and respective duration corresponding to at least one advertisement associated with the media content signal, wherein each of the at least one advertisement is to be provided with the media content to the client device.

4. The method of claim 3, wherein the second estimated duration comprises a sum of the duration of the media content and a duration corresponding to each of the at least one advertisement associated with the media content signal.

5. The method of claim 3, further comprising:
identifying, by the video system, a trick play request from the client device; and
directing, by the video system and responsive to the trick play request, transferring the second estimated duration to the client device.

6. The method of claim 3, further comprising directing, by the video system, providing the second estimated duration as an asynchronous message to the client device.

7. A system, comprising:
at least one memory for storing computer-executable instructions;
at least one processor in communication with the at least one memory, wherein the at least one processor is configured to execute the computer-executable instructions perform a method comprising:
receiving, from a client device, a request for a media content;
receiving, from an advertisement system, an estimated duration associated with a media content signal associated with the media content to be delivered to a client device, wherein the estimated duration is based at least in part on:
a first duration of the media content, and
a time estimate of the advertisement insertion opportunities within the media content;

generating metadata associated with the media content signal based at least in part on the estimated duration associated with the media content signal;

initiating a session with the client device to provide the media content signal associated with the media content, wherein initiating the session with the client device comprises providing the client device with the metadata associated with the media content signal;

receiving an identification of a post-roll content to be provided to the client device after a conclusion of the media content;

determining, by the video system, a time interval based at least upon a time difference calculated between:
the estimated duration, and
an actual duration of the media content, wherein the actual duration is a sum of the first duration of the media content and a second duration of advertisement insertion opportunities within the media content;

selecting the post-roll content based at least in part on the determined time interval, wherein the post-roll content extends at least the entire determined time interval; and directing a transmission of the post-roll content to the client device.

8. The system of claim 7, wherein the estimated duration is an estimate of the maximum duration of the media content signal based at least in part on the duration of the media content and the time estimate of the advertisement insertion opportunities prior to identifying advertisements corresponding to one or more of the advertisement insertion opportunities.

9. The system of claim 7, wherein the estimated duration is a first estimated duration and the method further comprises receiving a second estimated duration of the media content signal from the advertisement system, wherein the second estimated duration is based at least in part on the duration of the media content and respective duration corresponding to at least one advertisement associated with the media content signal, wherein each of the at least one advertisement is to be provided with the media content to the client device.

10. The system of claim 9, wherein the second estimated duration comprises a sum of the duration of the media content and a duration corresponding to each of the at least one advertisement associated with the media content signal.

11. The system of claim 9, wherein the method further comprises:
identifying a trick play request from the client device; and
directing, responsive to the trick play request, transferring the second estimated duration to the client device.

12. The system of claim 9, wherein the method further comprises directing providing the second estimated duration as an asynchronous message to the client device.

13. A system, comprising:
at least one memory for storing computer-executable instructions;
at least one processor in communication with the at least one memory, wherein the at least one processor is configured to execute the computer-executable instructions perform a method comprising:
identifying a user requested media content;
identifying a first duration of the user requested media content and one or more advertisement insertion opportunities;
determining a first estimated maximum duration of a media content signal associated with the media content based at least in part on the first duration of the user requested media content and the one or more advertisement insertion opportunities;

providing the first estimated maximum duration to a video system;

identifying at least one advertisement to insert in the one or more advertisement insertion opportunities;

determining a second estimated maximum duration based at least in part on a first sum of the first duration of the media content and respective durations corresponding to each of the at least one advertisement;

providing the second estimated maximum duration to a video system;

identifying post-roll content to be provided to the user after a conclusion of the media content;

determining a time interval based at least upon a time difference calculated between:
- the second estimated maximum duration of the media content signal, and
- an actual duration of the media content signal, wherein the actual duration is a second sum of the first duration of the user requested media content and a second duration of the advertisement insertion opportunities within the media content;

selecting, by the video system, the post-roll content based at least in part on the determined time interval, wherein the post-roll content extends at least the entire determined time interval; and transmitting the post-roll content to the user.

14. The system of claim 13, wherein identifying at least one advertisement to insert in the one or more advertisement insertion opportunities comprises:

identifying an inventory of available advertisements for insertion in the one or more advertisement insertion opportunities;

selecting the at least one advertisement from the inventory of available advertisements based at least in part on demographical, geographical, behavioral, or purchase history of a user associated with the user requested media content.

15. A method, comprising:

identifying, by an advertising system comprising one or more computer processors, a user requested media content;

identifying, by the advertising system, a first duration of the user requested media content and one or more advertisement insertion opportunities;

determining, by the advertising system, a first estimated maximum duration of a media content signal associated with the media content based at least in part on the first duration of the user requested media content and advertisement insertion opportunities within the media content;

providing, by the advertising system, the first estimated maximum duration to a video system;

identifying, by the advertising system, at least one advertisement to insert in the one or more advertisement insertion opportunities;

determining, by the advertising system, a second estimated maximum duration based at least in part on a first sum of the first duration of the media content and respective durations corresponding to each of the at least one advertisement;

providing, by the advertising system, the second estimated maximum duration to a video system;

identifying, by the advertising system, post-roll content to be provided to the user after a conclusion of the media content;

determining a time interval associated based at least in part on a time difference calculated between:
- the second estimated maximum duration of the media content signal, and
- an actual duration of the media content signal, wherein the actual duration is a second sum of the first duration of the user request media content and a second duration of the advertisement insertion opportunities within the media content;

selecting the post-roll content based at least in part on the determined time interval wherein the post-roll content extends at least the entire determined time interval; and transmitting, by the advertising system, the post-roll content to the user.

16. The method of claim 15, wherein identifying at least one advertisement to insert in the one or more advertisement insertion opportunities comprises:

identifying, by the advertising system, an inventory of available advertisements for insertion in the one or more advertisement insertion opportunities;

selecting, by the advertising system, the at least one advertisement from the inventory of available advertisements based at least in part on demographical, geographical, behavioral, or purchase history of a user associated with the user requested media content.

* * * * *